United States Patent [19]

Storbeck

[11] Patent Number: 5,142,160
[45] Date of Patent: Aug. 25, 1992

[54] METHOD AND DEVICE FOR DETERMINING THE VOLUME OF AN OBJECT ON A FLAT BACKGROUND

[76] Inventor: Frank Storbeck, Bobbeleweg 6, NL-1871 HB Schoorl, Netherlands

[21] Appl. No.: 575,590

[22] Filed: Aug. 31, 1990

[51] Int. Cl.⁵ .............................................. G01V 9/04
[52] U.S. Cl. .................................. 250/560; 356/379
[58] Field of Search ............... 250/223 R, 560; 356/376, 379, 380; 209/579, 587; 358/107

[56] References Cited

U.S. PATENT DOCUMENTS

| | | | |
|---|---|---|---|
| 4,535,782 | 8/1985 | Zoltan | 356/379 |
| 4,581,632 | 4/1986 | Davis et al. | 250/223 R |
| 4,704,603 | 11/1987 | Edwards et al. | 250/223 R |
| 4,767,212 | 8/1988 | Kitahashi et al. | 356/379 |

Primary Examiner—David C. Nelms
Assistant Examiner—Que T. Le

[57] ABSTRACT

Method for determining the volume of an object arranged on a flat background surface. The object is scanned using radiation in a predetermined pattern, the radiation reflected by the object is detected by a radiation pick-up means, the detected radiation is compared with radiation reflected by the background surface, and the volume of the object is computed from the comparison. A representative device determines the mass of a fish carried on a conveyor.

4 Claims, 1 Drawing Sheet

5,142,160

METHOD AND DEVICE FOR DETERMINING THE VOLUME OF AN OBJECT ON A FLAT BACKGROUND

BACKGROUND OF THE INVENTION

The present invention relates to a method for determining the volume of an object arranged on a flat background surface.

Such a method has been developed in the search for a method of determining the mass of caught fish.

On board ships fish are usually visually sorted to size by hand, whereafter they have to be sorted again on shore because of inaccuracies therein.

The method described herein enables automatic sorting and determining of the weight of each fish not only on shore but also on board a lurching and pitching ship.

SUMMARY OF THE INVENTION

The invention provides, in one embodiment, a method for determining the volume of an object arranged on a flat background surface. The object is scanned using radiation in a predetermined pattern, the radiation reflected by the object is detected by a radiation pick-up means, the detected radiation is compared with radiation reflected by the background surface, and the volume of the object is computed from the comparison. In a representative embodiment, a band of laser light from a fixedly disposed laser scans a fish that is moved by a conveyor beneath the laser, and from the volume of the fish the mass of the fish is computed using the known specific mass.

In a related embodiment, a device is provided for determining the mass of a fish carried on a conveyor. The subject device includes a laser bundle disposed at an angle relative to a conveyor, a camera such as a CCD camera disposed above the striking position of the laser bundle on the conveyor, and a computer connected to the output of the camera. A cylindrical lens is preferably placed in front of the laser. The computer is preferably coupled to the radiation pick-up means such that each grid of an interlaced image is processable by the computer. The computer is optionally arranged such that only those pixel values of the image generated by the radiation pick-up means that deviate in sufficient measure from zero pixel values are written into the memory of the computer.

BRIEF DESCRIPTION OF THE DRAWINGS

Further advantages, features and details of the present invention will become apparent in the light of a description of a preferred embodiment thereof with reference to the annexed drawing, wherein.

DETAILED DESCRIPTION OF THE PREFERRED EMBODIMENTS

Figure 1:
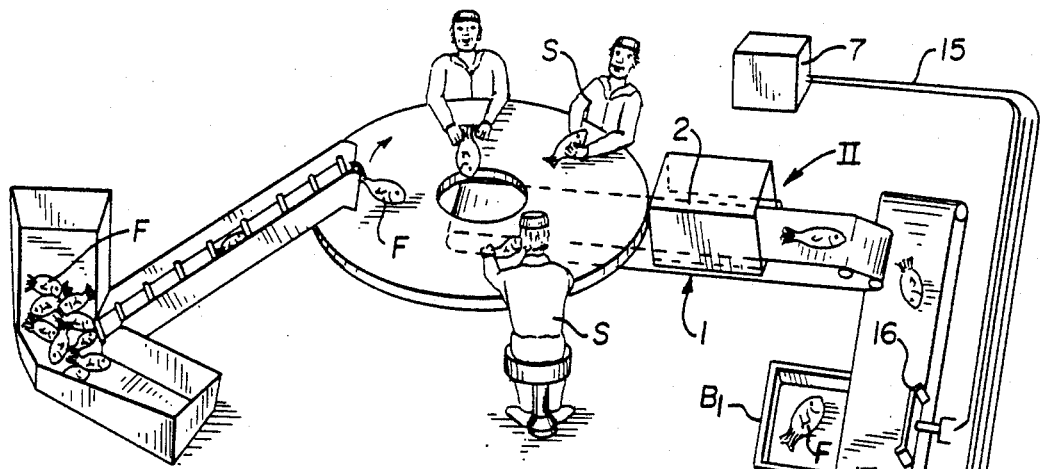
FIG. 1 shows a schematic view of the preferred embodiment of the method according to the present invention.
Figure 2:
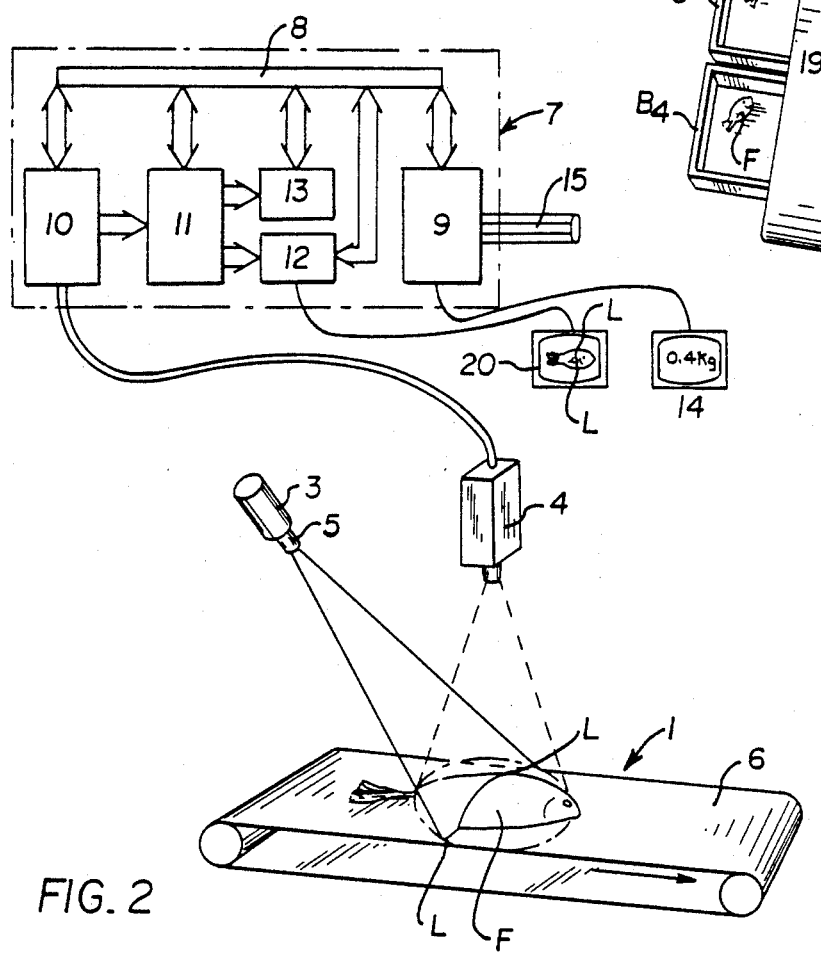
FIG. 2 is a schematic view of detail II from FIG. 1.

The innards of fish F are gutted in known manner by strippers S and the fish are placed on a conveyor 1 (FIG. 1). Disposed above the conveyor 1 in a cabinet 2 is a laser 3 (FIG. 2) and a CCD camera 4, both of a type readily available on the market. A diverging, cylindrical lens 5 is arranged in front of the laser 3 so that a line L of laser light is cast onto the belt 6 of the conveyor 1. In the embodiment shown the laser bundle is directed onto the conveyor 1 at an angle of approximately 45°, while the line L extends transversely of the conveyor 1. The CCD camera is disposed above the line L roughly perpendicular to the conveyor 1. When a fish F on the conveyor 1 moves under the line L of laser light, the image on the CCD camera 4 shifts from a straight line to a curved line—in the drawing shifted slightly to the left.

The CCD camera 4 is connected to a computer 7 (FIG. 1-2) in which are arranged standardly available units for processing video signals. In the embodiment shown the computer 7 comprises a central processor unit 9 connected to a VME bus and a video processing unit 10 likewise connected to the VME bus, a video memory 11 connected to the video processing unit 10 and the VME bus 8, a graphic unit 12 to which a monitor 20 can be connected for demonstration purposes and an intelligence unit 13 for determining the variety of fish and the like on the basis of characteristics to be previously entered. Finally, for verification and/or demonstration purposes a display means 14 is arranged on the central processing unit 9 on which can be read for instance the volume of a fish that has just passed through, the mass thereof—after multiplication of the volume by the previously entered specific mass—and the total volume of fish that has passed through.

The computer 7 is preferably connected via a cable 15 to sorting means 16, 17, 18 and 19 which sort the fish F of differing size into the respective trays B1, B2, B3 and B4 according to predetermined criteria.

The first extensive experiments with plaice have produced satisfactory results, that is, it proved possible to determine the weight of the plaice within 3% accuracy with the embodiment shown. At a speed of the conveyor belt 6 of roughly 20 centimeters per second this result was achieved by storing in sampled manner the output of the CCD camera, which made use of interlacing, per field in the video memory 11 of the computer 7 via video processing unit 10.

In order to obtain a great speed use is preferably made by the processing unit 10 of so-called runlength encoding, that is, that only those pixel values coming from the CCD camera 4 are stored which show a noticeable difference with respect to those pixel values generated by the radiation pick-up means 4 when no fish L are passing through the line L.

The stated results were obtained with the computer 7 that made use of Max-Video cards, which are available on the market, with a Unix-type operating system making use of clock signals of 10, 20 and 40 MHz.

It will be apparent that the embodiment shown comprises the following advantages:

in contrast to many other methods for determining the weight of fish the method according to the present invention is not sensitive to the movement of a lurching ship;

the device according to the present invention can take a compact form and can easily be constructed on board a cutter of existing size;

the preferred embodiment of the device according to the present invention can be constructed from components standardly available on the market and does not require considerable maintenance as few or no moving parts are incorporated therein; and/or an additional sorting on shore can be omitted, while sorting per variety of fish also becomes possible.

I claim:

1. A method for determining the volume and/or mass of a fish on a flat surface of a moving conveyor comprising the steps for:
   a) irradiating a position across the conveyor with a band of light transversely of the direction of movement of the conveyor, said band of light being directed to the conveyor at an angle thereto;
   b) advancing the conveyor at a substantially constant speed;
   c) repeatedly detecting the two dimensional video image of the band of light which becomes curved and shifted as a fish is carried by the conveyor under a video camera disposed above the position on the conveyor irradiated with the band of light;
   d) encoding the sampled video image for computer manipulation;
   e) comparing the encoded images of the curved and shifted band of light with the image of the band of light reflected only from the conveyor surface; and
   f) calculating the volume and/or mass of the fish from the comparisons made in the preceding step.

2. The method according to claim 1 wherein the band of light is irradiated by directing a laser source through a cylindrical lens.

3. The method according to claim 2 wherein the video image is captured by a CCD camera.

4. The method according to claim 3 wherein the video image is encoded by use of run-length encoding.

* * * * *

UNITED STATES PATENT AND TRADEMARK OFFICE
CERTIFICATE OF CORRECTION

PATENT NO. : 5,142,160
DATED : August 25, 1992
INVENTOR(S) : Frank Storbeck

It is certified that error appears in the above-identified patent and that said Letters Patent is hereby corrected as shown below:

Cover page, after Inventor information, insert --[73] Assignee: Rijksinstituut voor Visserijonderzoek, Ijmuiden, The Netherlands--.

Signed and Sealed this

Twelfth Day of October, 1993

Attest:

BRUCE LEHMAN

*Attesting Officer*  *Commissioner of Patents and Trademarks*